United States Patent [19]

Garner et al.

[11] Patent Number: 4,887,311
[45] Date of Patent: Dec. 12, 1989

[54] RADIO WITH OPTIONS BOARD

[75] Inventors: Terry N. Garner, Lynchburg; Robert P. Dixon, Rustburg, both of Va.

[73] Assignee: General Electric Company, Lynchburg, Va.

[21] Appl. No.: 39,331

[22] Filed: Apr. 17, 1987

[51] Int. Cl.$^4$ .......................... H04B 1/40; H04B 1/06
[52] U.S. Cl. ..................................... 455/76; 455/183; 455/186; 455/349
[58] Field of Search ................... 455/76, 77, 183, 186, 455/151, 349, 185; 340/825.44, 825.48

[56] References Cited

U.S. PATENT DOCUMENTS

| | | | |
|---|---|---|---|
| 4,484,355 | 11/1984 | Henke et al. | 455/76 |
| 4,486,624 | 12/1984 | Puhl et al. | 455/77 |
| 4,618,997 | 10/1986 | Imazeki et al. | 455/76 |
| 4,688,261 | 8/1987 | Killoway et al. | 455/76 |
| 4,771,399 | 9/1988 | Snowden et al. | 455/186 X |

OTHER PUBLICATIONS

"The Up: The Key to an Advanced Frequency Synthesized HF SSB Amateur Radio Transceiver", IEEE Transactions on Consumer Electronics; vol. CE-26, Aug. 1980, Robert M. Groh et al., pp. 234–246.
*Motorola Dyna Tac 6000X Universal Mobile Telephone;* 9/12/83.

Primary Examiner—Benedict V. Safourek
Assistant Examiner—Ralph Smith
Attorney, Agent, or Firm—Nixon & Vanderhye

[57] ABSTRACT

A FM mobile radio is disclosed which is capable of future functional expansion due to a unique microprocessor hardware/software control system. The radio includes a control microprocessor which is capable of performing all the basic radio control functions. In addition, options are added via a plug-on board that includes an option microprocessor which interfaces with the control microprocessor over a data bus and with the radio's audio circuits through audio processing circuitry. The software of the system allows control to be passed to the option board. The radio operates in a standard control mode and an option control mode. In the standard mode, in which no option board is present, the control processor performs all basic radio control functions. In the option mode, where the option control microprocessor is present, the main control processor typically receives commands from the option board.

58 Claims, 11 Drawing Sheets

RADIO WITH OPTIONS BOARD

FIELD OF THE INVENTION

This invention generally relates to a digitally-controlled radio communication device. More particularly, the invention relates to a microprocessor controlled radio, whose hardware and software implementation flexibly allows future options (even those presently undefined) to be incorporated without rewriting the standard radio control software and without modifying the hardware. The invention is particularly suited for use in mobile and/or portable radio devices.

BACKGROUND AND SUMMARY OF THE INVENTION

The FM mobile radio marketplace demands a wide variety of different optional features to meet diverse customer requirements. Thus, it is desirable to provide a radio having signalling options such as continuous tone controlled squelch (CTCSS), selective call decoding (a paging function using a set of signalling tones), DTMF encoding for generating tones to enable interconnection with a telephone system, automatic transmission (upon keying the transmitter) of status and identification data messages (e.g., for police use), etc. These and/or similar functions also can be implemented using digital signals rather than tones.

While it is highly desirable for a portable FM mobile radio to have the capability of supporting these various options, cost and size constraints generally preclude the incorporation of all functions in a single package. The design of the present invention serves to produce a radio capable of a multitude of various system configurations, none of which burden the simplest version of the product.

Early designs of portable FM mobile radios attempted to achieve this same result by adding hardware modules to the basic radio. The resulting increase in the size of the radio and the associated mechanical design complications are obvious disadvantages of such a solution. In addition, due to constraints of the hardware design, the types of functions which may be added to the radio are significantly limited.

With the development of low current, low cost, single chip microprocessors, software implementation of many of the control and signaling functions in portable radios has become practical. However, due to limitations in the ROM size of such microprocessors, there is a limitation as to the number of functions which may be incorporated therein due to the storage space required to implement the basic radio control functions.

Additionally, low processing speeds associated with such prior art microprocessor control typically prevented software versions of certain signaling functions from being practically implemented. For example, the selective call decoding option referred to above may involve decoding tones that are of a sufficiently high frequency that it is difficult for a microprocessor to execute a tone decoding routine fast enough to have time to perform the basic radio control software functions as well.

In the portable radio art, only single chip microprocessors are commercially practical for FM portable mobile radio applications (due chiefly to size and power consumption considerations). In this art, the addition of future options typically required remasking the basic control processor, adding lost time and risk to the manufacturing process.

The present invention provides a basic portable FM mobile radio design capable of future functional expansion by utilizing a unique microprocessor hardware/software control system. The radio includes a control microprocessor which is capable of performing all the basic radio control functions. In addition, options are added via a plug-on board that includes an options microprocessor which interfaces with the control microprocessor over a data bus and with the radio's audio circuits through audio processing circuitry. The software of the system allows control to be passed to the option board.

The radio operates in a standard control mode and an option control mode. In the standard mode, in which no option board is present, the control processor performs all basic radio control functions. In the option mode, where the option control microprocessor is present, the main control processor typically receives commands from the option board. The multiprocessor design of the present invention enhances overall processing speed by utilizing parallel processing where one processor performs basic control functions while the other performs optional dedicated tasks.

BRIEF DESCRIPTION OF THE DRAWINGS

These as well as other objects and advantages of this invention will be better appreciated by reading the following detailed description of a presently preferred exemplary embodiment taken in conjunction with the accompanying drawings of which:

FIG. 6 is a flowchart depicting the general sequence of operations performed by the options microprocessor in performing a required task;

FIG. 7 is a flowchart generally depicting the sequence of operations performed by the options microprocessor in performing a selective call decoding task;

FIG. 8 is a flowchart generally depicting the sequence of operations performed by the options microprocessor in performing an emergency message transmission task; and FIG. 9 is a schematic representation of an exemplary embodiment of the audio processor integrated circuit shown in FIG. 1.

DETAILED DESCRIPTION OF THE INVENTION

Figure 1:
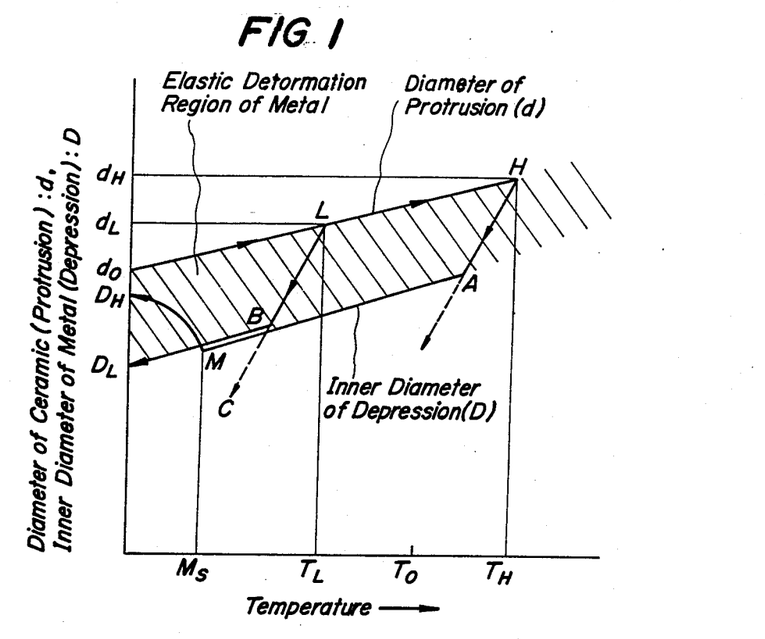
FIG. 1 is a schematic representation of an exemplary embodiment of the hardware elements of a radio system in accordance with the present invention.

Turning to the hardware elements of the radio system of FIG. 1, Universal Device Connector (UDC) 2 comprises a set of contact pins on the side housing of the portable radio and permits the radio system circuit components to be interconnected with a wide range of external audio accessories. For example, a hand-held speaker microphone or an earphone may be connected to the radio system via UDC 2. In addition, operating parameter data is loaded into RAM 7 through UDC 2.

Keypad 4 includes a set of control keys 6 and optional keys 5 which are repetitively scanned by the processors. Although these keys are schematically represented as being part of the same keypad, keys 5 and 6 may be located at independent locations on the radio housing. The control keys 6 activate the basic radio controls which are responded to by control microprocessor 8. The keys 6, for example, include the conventional volume up/down, channel up/down, push to talk (PTT) and home channel controls.

Keys 5 are associated with the expanded function capability provided by the option board 10. By way of example only, these switches may comprise 16 keys including 12 TOUCH-TONE ® keys, each of which initiate the transmission of corresponding tone digit data to option board 10.

RAM 7 is dedicated to storing "personality" data. Personality data is customer dependent data which determines such radio operating parameters as the RF operating frequency, the CTCSS tones to be generated, etc. that are required to meet a customer's specific needs. The data is loaded in RAM 7 via an external device connected to UDC 2. The stored operating parameter data is transferred under software control to the FIG. 1 components to control operation of the radio system according to the customer's needs. RAM 7 may, for example, be a volatile memory provided with a battery backup, or an erasable programmable read-only memory (EPROM).

Control microprocessor 8 is a single chip microcomputer, which may, for example, be a Hitachi HD 6305. As will be explained in detail below, the control microprocessor operates in two basic control modes. In the standard control mode (where no option board is present), the control processor performs all the basic radio control functions. In the option mode, where an option board microprocessor is present, the main control processor receives commands from the option board microprocessor.

Upon power-up of the radio, the control microprocessor automatically senses whether the option board is present and takes appropriate action dependent on the sensed operating mode. More specifically, in the standard mode of operation, the control microprocessor monitors the control switches and performs the indicated tasks, i.e., channel up/down, volume up/down, push-to-talk, and channel monitor. Additionally, the control microprocessor 8 senses the presence of UDC devices connected to UDC 2 and takes appropriate actions, i.e., load/store personality data to RAM, switch audio circuits to external accessories, etc. The control microprocessor 8 also monitors and controls internal hardware, i.e., the display 18, audio processor 24, synthesizer 22, etc.

When an option board is plugged in and active, a control signal is sent from the option microprocessor 12 to the control microprocessor 8. This signal interrupts the control microprocessor's main program flow and a predescribed sequence of signals is exchanged over the serial bus between the control microprocessor and the option board, thereby causing the control processor to acknowledge the presence of the option board and to prepare to accept instructions from the option board microprocessor.

In the preferred embodiment, the option board microprocessor 12 transfers executable code over the serial bus 11 into the internal RAM (not shown) of the control microprocessor 8. This code instructs the control microprocessor 8 to perform one of the basic control routines stored within its internal ROM (not shown). In this manner, the option board has access to all controllable hardware within the system, i.e. the frequency synthesizer, audio processor, display, data memory, UDC, and keyboard switches.

The option board microprocessor 12 may, for example, also be a Hitachi HD 6305. In addition, the option board 10 includes an analog to digital converter 16 which receives the audio signal from receiver 28 on audio input line 35 to provide digital signals that the microprocessor 12 can process. The microprocessor 12 transmits output digital signals to digital to analog converter 14 which provides an analog output signal to the input of audio processor 24. The microprocessor 12 is connected to the control microprocessor 8 via control bus 13 and serial bus 11.

Selective call decoding is an example of one of the many options that may be provided to the user by the option board 10 of the exemplary embodiment. The option board 10 provides selective call decoding by decoding tones which are received by the A/D converter 16. Additionally, option microprocessor 12 is capable of generating tones via D/A converter 14 which are coupled to the audio processor's tone-in input. Such a generated tone may be added with the microphone audio signal to modulate the transmitter.

Such selective call decoding is performed due to the combined action of option microprocessor 12 and control microprocessor 8. In this regard, if "personality" data from RAM 7 indicates that selective call decoding is to be performed on a defined channel, control microprocessor 8 via control bus 13 informs the option microprocessor 12 to check the output of A/D 16 for a predetermined tone pattern. If such a tone pattern is detected, then the option board microprocessor 12 sends instructions over control bus 13 defining the operation the control microprocessor 8 must perform in order to complete the selective call decoding process. In this regard, the control microprocessor 8 is instructed to open the audio circuits in the audio processor 24, to send an alert tone to inform the user that he/she has been paged, and to leave the audio circuit open to pass on the desired message.

Display 18 is a conventional liquid crystal display. The display 18 is driven by a serially controlled display drive 20 which may, for example, be a NEC 7225.

The RF frequency synthesizer 22 operates based on a single crystal which generates a frequency on the order of 13.2 megahertz. Based on data received from the control microprocessor serial bus 11, this basic frequency may be operated on (e.g., multiplied, divided) to generate a desired frequency on line 23 to drive the receiver 28 and transmitter 26.

As can be seen from FIG. 1, strobe and data lines are connected to the display drive 20, the audio processor 24, the RF frequency synthesizer 22 and the option board 10. These components also receive an enable input (E1 to E5) from control microprocessor port C, which identifies which device is targeted to receive the data then present on the data line. In order to receive the data, a strobe pulse must also be present. This strobe pulse clocks data into an interface register (not shown)

in one of the display drive 20, frequency synthesizer 22, audio processor 24, option board 10.

The transmitter circuits 26 and the receiver circuits 28 are conventional FM circuits which receive an RF carrier frequency on line 23 from synthesizer 22. The transmitter 26 also receives from audio processor 24 an audio input (from the transmitter audio input line 21) via the RF frequency synthesizer which serves to modulate the RF carrier. In addition, the transmitter 26 receives control signals via the transmitter enable line 32 from control microprocessor 8 which serves, for example, to power up the final transmitter amplifier stages. The receiver 28 generates an audio signal output on line 29.

Antenna switch 30 switches antenna 33 to either the transmitter 26 or the receiver 28 depending upon whether the radio is in the transmit or receive mode. The antenna switch position is controlled by the control signals that enable the transmitter on line 32. Thus, when the transmitter is enabled, the antenna is switched to the transmitter and when the transmitter is not enabled the antenna will be switched to the receiver.

Audio processor 24 operates under microprocessor control and provides the audio filtering and shaping required in both the transmit and receive modes. In the transmit mode, the audio processor 24 filters, shapes and routes audio signals from the microphone input to the transmitter audio input line 21. Similarly, the audio processor 24 receives as an input the receiver audio output signals on line 31, processes and routes such signals to the speaker output of the audio processor. A schematic diagram of the audio processor 24 is shown in FIG. 9. The audio processor 24 is described in detail in application Ser. No. 07/039,245, filed concurrently herewith. Reference is made to this application for the operational details of the audio processor, which application is expressly incorporated by reference herein.

FIGS. 2-8 are flowcharts which delineate the sequence of operations performed by the control microprocessor 8 and the option board microprocessor 12 under software control. Initially, it is noted after the power-up routine is executed, the routines key scan, GESTAR (an "emergency" message loop) receive and UDC test are repetitively executed. The transmit routine is executed upon the depression of a push to talk (PTT) key.

Figure 2A:
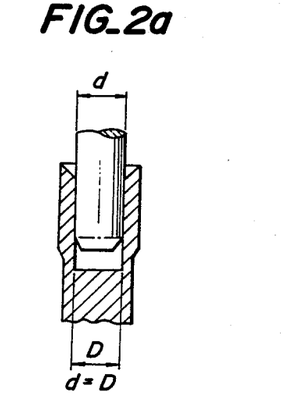
FIG. 2 is a flowchart depicting the sequence of operations performed by the control microprocessor during the execution of a power up and initializing routine.
Figure 2B:
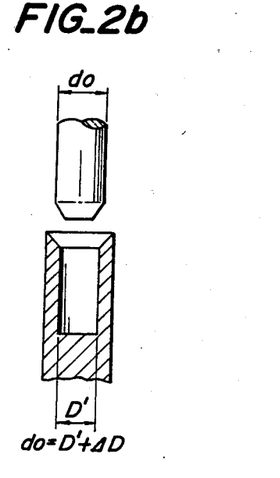
Figure 3:
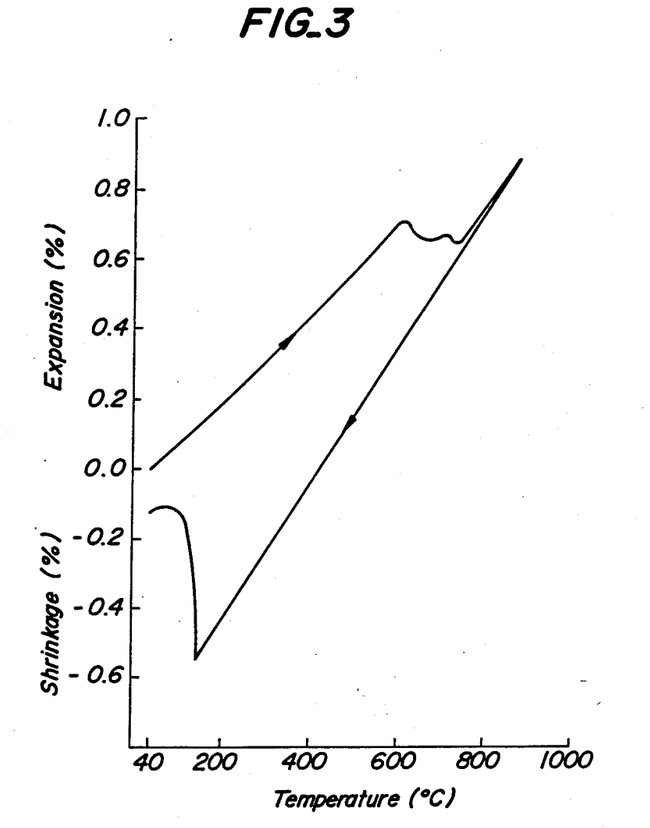
FIGS. 3a and 3b are flowcharts depicting the sequence of operations performed by the control microprocessor during the execution of a key scan routine.
Figure 4:
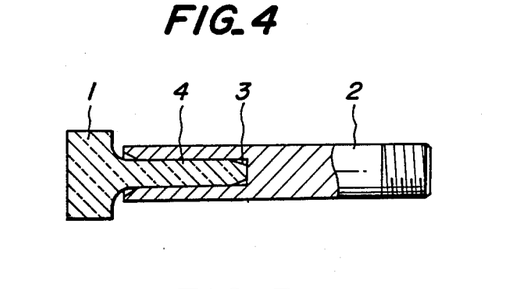
FIGS. 4a and 4b are flowcharts depicting the sequence of operations performed by the control microprocessor during the execution of a transmit routine.
Figure 5:
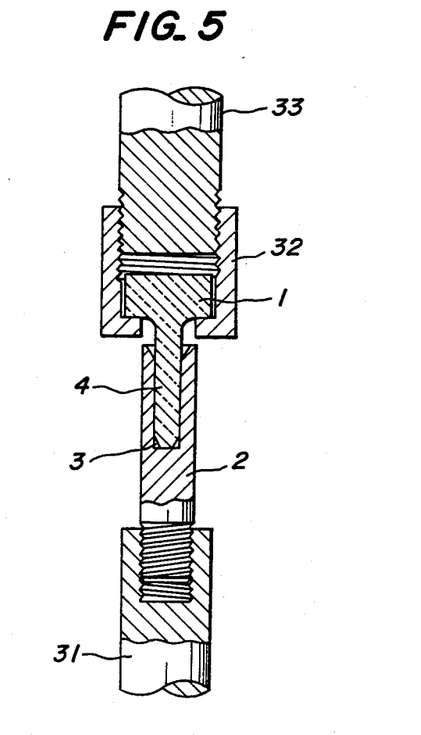
FIGS. 5a and 5b are flowcharts depicting the sequence of operations performed by the control microprocessor during the execution of a receive routine.

FIG. 2 shows the control microprocessor 8 power up and initializing routine (100). Initially, the microprocessor control ports are set up as input or output ports and the internal registers are cleared. Additionally, a brief delay is introduced in order to allow for any transient signals to dissipate after the power is turned on (102).

Thereafter, microprocessor 8 looks to see whether a UDC device is connected to UDC 2 (104). If so, a check is made to determine whether the currently attached device is a personality data loader (106). If so, then the user's personality data is entered into RAM 7 by executing a routine which loads the user's operating parameter data into RAM 7 (110).

If the loader is not attached to the universal device connector 2, then a check is made to determine whether the option board 10 is present (108). It is noted that the option board is referred to as the signal board (SIG. BD) in the flowcharts. If the option board is present, then a flag is set to provide a mechanism for readily determining that the option board is present (112). In addition, initializing data is sent to the option board microprocessor 12 (112).

Initially when the option board 10 is first connected to the system, the option board microprocessor 12 sends information to the control microprocessor indicating what options it has been programmed for. The control microprocessor 8 then sends the necessary personality data information from the RAM 7 to the option board. Thus, the initializing data relates to the particular option programs stored in the microprocessor's program memory.

For example, if the DTMF encode option is present in the option board microprocessor 12, the data bytes required to generate the required tones may, for example, be transferred to the internal RAM of the microprocessor 12 from RAM 7. Such information is transferred at power up because when the need arises to utilize these options, there may not be sufficient time to load the information from RAM 7 to the option board.

Thereafter, or if the signal board is not present as determined at block 108, the power up channel is loaded, the channel is set up and the display is initialized to identify the channel (114). Block 116 reflects an option provided in certain radios, wherein if the channel up button and the volume up button are pressed simultaneously, the user receives a display of indicia which indicates what software package is present in the radio (118).

If the channel up and volume up buttons are not pressed simultaneously, then the microprocessor loads the receive channel and displays the channel name (120) on display 18.

Thereafter, the microprocessor 8 checks to determine whether the loader is attached (122). If the loader is attached, then a check is made as to whether the push to talk (PTT) button is currently being operated (124) and if it is, an alarm is sounded (126). If the loader is not attached, then the alarm is turned off (128). Likewise, if push to talk is not being operated the alarm is turned off.

Next, as indicated in block 130, a check is made to determine whether a power up beeping option is present in the radio. If so, then a beep will be sounded (132). Thereafter, a delay of 100 milliseconds (134) is introduced.

Next as indicated at 136 a check is made of the loaded channel information to insure that it is correct. If the channel information is not correct, then a conventional error routine is executed (140). If the channel information is valid, then the key scan routine (200) is called.

After a determination that the channel information is valid, the key scan subroutine shown in FIGS. 3a and 3b is executed by control microprocessor 8. The control microprocessor 8 repetitively scans the keypad 4 and the universal device connector 2 (UDC).

Initially, the UDC contact pins are scanned to determine whether any external audio accessories are connected to the system which require the transmit routine to be executed (202). If the presence of a UDC device is sensed, the microprocessor 8 checks to determine whether an external push to talk control switch has been actuated through an attached speaker microphone (204). If so, the processor's transmit subroutine is called (206) (which will be discussed in detail below).

If no external push to talk key has been depressed, or no UDC device has been detected, then the control microprocessor 8 monitors the keypad control switches 6 (208). The control switches actuate basic radio control functions (e.g., volume up/down load, home channel, channel up/down, push to talk) which are all performed under microprocessor 8 software control as will be discussed further below.

If no control switches have been depressed, then the control microprocessor 8 checks to determine whether the option signal board 10 is connected to it (242). Such a connection converts the radio from a standard, basic function radio to an extended function "systems" radio. The control microprocessor 8 determines that the option board is present by raising the enable line E4 to a logic "1" level via serial bus 11 (FIG. 1). If the option board is present, an "option board present" signal is generated by the option board 10.

Once the presence of the option board 10 is confirmed, the control microprocessor 8 sends keypad information to the option board (244) relating to the sixteen optional keys 5 on the keyboard 4. The keys 5 are not associated with the "basic" radio, but rather are present in the system together with the option microprocessor 12. When one of the keys 5 is actuated, the control microprocessor 8 senses the key's row ad column on the keypad and sends this information to the option processor 12 (244).

With the row and column information the options processor 12 initially determines, for example, by a table lookup operation, the function that is associated with the key that has been depressed. Next the option board microprocessor 12 retrieves from its memory executable code corresponding to the function to be performed. The executable code is then sent to the internal RAM of control microprocessor 8 along with an instruction calling for the control microprocessor 8 to jump to the internal RAM location at which the executable code is stored. Thereafter, the control microprocessor 8 executes the transferred code (244).

The control microprocessor 8 may, for example, have 192 byte of storage space in its internal RAM. At least 40 bytes are reserved for the storage of option board executable program code. Thus, the control microprocessor 8 can be controlled to perform a multitude of functions under the control of options microprocessor 12.

By way of example only, the code transferred by the option board microprocessor may serve to cause microprocessor 8 to send data to the RF frequency synthesizer 22. The control microprocessor 8 in executing this code transmits data signals via the strobe and data lines of port B (FIG. 1), which are then available to the RF frequency synthesizer. The data bits are received by the RF synthesizer 22 upon receiving an enable pulse on line E2. The received data bits change the frequency of operation of the RF synthesizer 22.

Similarly, data transfer routines may be initiated by the options board microprocessor 12 which control the control microprocessor 8 to send data to the audio processor 24 or the display 18 depending upon whether an enabling pulse is transmitted on lines E3 or E1, respectively.

The option processor 12 additionally can initiate execution by the control microprocessor 8 of key or unkey the transmitter routines. A "key the transmitter" routine serves to send control signals to the transmitter circuits via the transmitter enable line 32 to power up, for example, the final transmitter" amplifier stages. An "unkey the transmitter" routine turns off the power input to the transmitter to prepare the system to switch back to the receive mode.

A further example of an executable routine loadable by the option board processor 12 to the control processor is the "load 'personality' data from RAM" routine. The data stored in RAM 7 may be transferred to the FIG. 1 components by this routine to configure the system according to a particular customer's needs.

Thus, it should be recognized that the option board microprocessor 12 may be advantageously utilized to control the microprocessor 8 to, in turn, control any of the devices shown in FIG. 1 which is connected to its ports.

Turning back to block 208, if the scanning of control key switches 6 indicates that a control key has been depressed, then a check is made to determine whether the push to talk key has been depressed (209). If so, the transmit routine discussed below in conjunction with FIGS. 4a and 4b is executed (211).

If the push to talk key has not been depressed, a check is made to determine whether the monitor key has been depressed (210). If the monitor key has been depressed, the microprocessor 8 opens the audio path to the speaker connected to audio processor 24 even when no carrier is present (230). If the channel is active, then the operator can monitor the channel activity. If the channel is inactive, the user will hear only noise, but will be able to adjust the radio volume to a desired setting. When the monitor key is released, the processor 8 will disable the receive audio path and will then reenter the main loop by checking for a UDC device (202).

If the monitor key has not been depressed, a check is made for whether the special signalling options (e.g., CTCSS, selective call decoding) have been disabled by the control key operation of the user (212). If so, then the signalling functions are disabled by a generated toggle signal (232) and the main loop is reentered at 202.

If the signalling options have not been disabled, then checks are made at 214 and 216 as to whether the volume up/down control keys have been actuated and the appropriate volume increase or decrease (234, 236) control function is implemented. In this regard, the control microprocessor 8 sends digital signals over serial bus 11 to the audio processor 24 to change the level of its programmable attenuator. The new volume level may also be transmitted to display 18.

Next the channel up and channel down control switches are checked 218, 220 to determine whether the operator is attempting to move the channel up or down. If so, the appropriate channel control function is performed (238, 240).

The channel is changed by loading new channel data into the internal RAM (228) of control microprocessor 8. This new channel data is then sent by the control microprocessor 8 to the synthesizer 22. The new channel number also transmitted to the display 18. The present invention contemplates channel changing either by manipulating channel up/down control keys or by entering a specific channel via keypad keys 5 and loading the specified channel into the internal RAM of the control microprocessor 8 under the control of the option board microprocessor 12.

Turning to FIG. 3b, a check is made to determine whether the home channel control switch has been actuated (222). This switch causes the radio to be placed on a preprogrammed "home" channel. If so, then a check is made to determine whether the home channel requires an emergency message to be transmitted (224) and if so, an emergency routine is executed (226). The emergency state may be indicated by the actuation of a predetermined switch on the radio housing. If an emergency routine need not be executed, then the home channel is loaded into the control microprocessor internal RAM (228) and the main loop is reentered at 202.

Turning back to FIG. 3a at block 242, if the option signal board 10 is not present, block 244 is bypassed and an emergency message loop (GESTAR 246) is entered which is shown in FIG. 3b. This loop provides for sending a transmitter identifier at the start of each message transmission and includes an emergency message routine.

Initially, the option board present flag is checked to determine whether the option board is present (248). If the option board is present, a check is made to determine whether the RAM 7 personality data includes a provision for the GESTAR routine just entered (250). If so, an initial check is made in block 252 to determine whether the home emergency flag has already been set. If the home emergency flag is not set, then an additional emergency flag is checked which is utilized if a UDC device tries to send an emergency message (254).

If the emergency flag from the UDC is not set, then a check is made as to whether an emergency message needs to be transmitted on the home channel (256). If so, then the emergency message counter is cleared and the emergency flag is reset (260). If not, then a check is made to determine whether the UDC emergency switch is closed (258). After the emergency flag has been set in block 260, a check is made to determine whether GESTAR was entered through the transmit routine (262) and if so, then the transmit routine is reentered at LOOPT1 (see FIG. 4A).

If one of the emergency flags or switches (256, 254 or 258) indicates that an emergency message must be transmitted, then the Type 99 signaling option (i.e., the selective call decoding option) is disabled (261) and a check is made to determine whether this is the first time through the emergency message loop (263). The emergency message loop is structured so that the emergency message is transmitted five times.

If this is the first time through the emergency message loop, then the emergency channel is loaded (267) and a check is made to ensure that the synthesizer 22 is locked on the emergency channel (268). If the synthesizer 22 is locked on the emergency channel, then the flags indicated in blocks 269 and 270 are set and the transmit routine is called to transmit the emergency message (TXROU).

Turning back to block 263, if this is not the first time through the emergency message loop, then a check is made at block 264 to determine whether this is the fifth (or last) emergency message. If this is not the fifth emergency message, then a check is made to determine whether the next emergency message should be sent (265) and if so, the sequence described above starting at 267 is repeated. If this is the last emergency message, the emergency flags are reset (266) and then a check is made at block 262 to determine whether GESTAR was entered via the transmit routine and depending upon the results of this test either the transmit (400) or the receive routine (600) is entered.

Turning next to the transmit routine (400) shown in FIGS. 4a and 4b, initially a check is made to determine if transmission should be locked out due, for example, to the battery voltage being too low. If such a condition exists, a transmission lock-out flag is set. This flag is checked (402) and if the flag is set, the transmitter is turned off (403) and an alarm routine is entered (405).

If the lock-out flag is not set, a check is made to determine whether the radio is in the channel scanning mode (404). If the channel scan is on, then the control microprocessor 8 turns it off (406).

If the channel scan is off or has been turned off (406), a check is next made to determine whether the current channel is a receive-only channel over which transmission is not permitted (408). If so, the transmitter is turned off and alarm routine is executed (403, 405).

If the current channel is not a receive-only channel, a check is made to determine whether the personality data in the RAM indicates that the transmitter is automatically locked-out if the channel is busy. If this option is present (410) and the channel is busy (412), the transmitter is turned off and the alarm routine is executed.

In block 414, the control microprocessor 8 establishes the radio operating conditions necessary for transmission if the channel busy option is not present or, if it is present, the channel is not busy. For example, the transmit channel frequency is loaded into the synthesizer 22 and, the display 8 is updated via display drive 20. Thereafter, the synthesizer 22 is checked to determine whether it is locked onto the transmit channel frequency (416). If not, the transmitter is turned off and the alarm routine is executed.

If the synthesizer is locked, then a check is made as to whether an emergency message is to be sent (418). If so, the emergency message generating routine shown in FIG. 4b (GESID) is entered.

If an emergency message does not need to be sent, a check is made to determine whether transmission is to occur at a high or low transmission power level as determined by the setting of a high transmission power level flag (420) (which is set based upon the personality data stored in RAM 7). Depending upon the test in 420, either low or high transmission power level data is retrieved (422, 424). Thereafter, as shown in FIG. 4b, the transmitter 26 is loaded with the correct power level (426) and a 10 ms delay is introduced to allow the synthesizer to stabilize.

After the proper power level has been loaded into the transmitter, a DTMF flag is checked to determine whether the DTMF encode option for telephone system interconnection is being utilized (428). This check determines whether a voice or DTMF transmission is to be made. If the DTMF flag is set, then a check is made to determine whether DTMF sidetones are to be generated (430). If DTMF tones are to be generated (430), the audio paths are opened to the audio processor speaker (432). The audio paths are opened in the audio processor 24 (shown in FIG. 9) by application of a control signal to one of the switches 907 as described in the aforementioned copending application filed concurrently herewith.

It should be recognized that, while the control microprocessor 8 is performing the necessary checks (428, 430) and opening the audio path (432), the option microprocessor is actually generating the required tones. Next, a check is made to determine whether the option board has stopped generating DTMF tones (434) and if so, the transmitter is turned off (438) and the receive routine is entered (440).

If the DTMF tone transmission has not been completed (434), then a check is made to determine whether the synthesizer is locked on frequency (436) and if so, the end of DTMF transmission check (434) is repeated. If the synthesizer is not locked, the transmitter is turned off and the receive routine is entered (440).

Returning to block 428, if the DTMF flag is not set, then a further check is made to determine whether an emergency message needs to be transmitted (442). If not, a check is made to see if the option board is present (444) and if so, the emergency message flag is checked to see if an emergency message has already been sent (446). If the emergency message flag is already on, the emergency loop labeled GESID is entered. If not, a check is made to determine if a transmitter identifier (GESTAR) needs to be sent (448).

If the option board is not present, or the transmitter identifier does not need to be sent, the loop GESID4 (474) of FIG. 4a is immediately entered. The GESID4 routine is a subroutine which limits the transmission time to a predetermine time period. In block 476, the count reflecting the transmission time limit is retrieved and loaded in a counter. The synthesizer 22 is checked to determine if it is in a locked state (478) and if not, the transmitter is turned off (403). If the synthesizer is locked, then a check is made to determine whether the PTT key is being operated (480) and if not, the receive routine is entered (600). If the push to talk key is depressed, then the counter is decremented (482). When the counters content equals zero (484), the transmitter is turned off (403). If the count is greater than zero, the wait mode is entered (485) and then the GESTAR routine (246 of FIG. 3b) is called. It is noted that if entered from the transmit routine, GESTAR returns to the same GESID4 subroutine at the point labeled LOOPT1 in FIG. 4a.

Turning back to FIG. 4b at block 450, if the transmitter identifier must be sent, a check is made to determine whether the emergency counter is equal to zero. If the emergency counter has a non-zero value stored therein, then the GESID loop had previously been executed and control goes immediately to the GESID4 routine which, in turn, calls the GESTAR routine that insures that the emergency message is transmitted a predetermined number of times, (e.g., 5 times).

If the emergency message flag (446) is on, a check is made to determine whether this is the first pass through the GESID loop (452). If this is the first time through the GESID loop or if the result of the counter check at 450 is yes, then a GESTAR command is sent (454) to the signal on FIG. 4b board microprocessor 12 in order to alert the option microprocessor 12 that the emergency message option has to be executed. If the check at 452 indicates that this is not the first time through the GESID loop, then block 454 is bypassed since the GESTAR command had previously been sent to the option microprocessor.

The check at block 456 relates to the channel guard (i.e., CTCSS) coding option. This option involves to calling a desired party by transmitting a low frequency tone which is selected such that only the desired party's receiver will receive the transmitted tone. If this option is not present, then the channel guard tone path in audio processor 24 will be turned off (458) in a manner described in the aforementioned copending application filed concurrently herewith.

On the other hand if the channel guard option is being employed then block 458 is bypassed. In block 460, the audio paths in audioprocessor 24 must be so that the tones can go through. Additionally, the microphone audio paths in audio processor 24 are turned off to block any voice transmission at this time in a manner described in the aforementioned copending application filed concurrently herewith.

It should be understood that the option processor 12 is executing a routine for transmitting the actual emergency message and the associated transmitter ID. During this time the control microprocessor 8 in block 462 enters a wait mode until it receives a signal from the option microprocessor 12 that the message is complete (464). It is noted that the multiprocessor architecture of the present invention permits the functions of generating channel guard tones by the control microprocessor 8 and generation of emergency messages to occur simultaneously, thereby enhancing overall processing speed.

As indicated in block 466, once the message complete signal is received, the emergency message counter is incremented to keep track of the number of times the emergency message has been transmitted. Additionally, the emergency flag is set to indicate that the processor is in the emergency mode and the emergency message flag is reset to indicate that an emergency message has been transmitted. Also in block 466 the GESTAR path is turned off and the audio processor 24 channel guard path and the microphone paths are enabled to set up a normal audio path in the manner described in the aforementioned copending patent application filed concurrently herewith.

In block 468, a check is made to determine whether the emergency lock flag has been set. This feature provides for the selection of a preselected channel for emergency message transmission. If the emergency lock flag is set then the channel is loaded (470) and the receive routine is entered (600) for a predetermined time period between emergency message transmissions (e.g., 10 seconds) as indicated by the option microprocessor 12 (which will send a signal to the control processor at the end of the predetermined period). If the emergency lock flag is not set, then the GESID4 routine is entered (472).

FIGS. 5a and 5b disclose the sequence of operations performed in the receive routine (600). This routine is entered from the GESTAR emergency message checking routine. As mentioned above, in FIG. 3b at block 262, a check is made to see whether the GESTAR routine was entered from the transmit routine. If not, the receive routine is entered. In this routine a check is initially made to determined whether there is an active channel and whether the audio processor 24 audio path is open (602). If the audio path is not open, a test is made to determine whether the battery is low (604). If the test indicates a low battery condition, an alarm will alert the user of this condition. If the audio path is open, the battery test is not made, but rather the state of monitor flag is checked (605). The monitor flag indicates whether the monitor switch has been set which enables the user to monitor the channel in order, for example, to set the radio volume level.

If the monitor flag has been set, then the receiver routine is bypassed and a universal device connector test routine is executed (606). In this UDC test routine (the details of which are not germane to the present invention), a check is made to determine which device(s) is connected to the radio system. Depending upon the device detected, appropriate DC levels and other operating parameters are set in the radio system to enable operation with the detected device(s). The UDC test routine is exited and the key scan routine described in FIGS. 3a and 3b is then executed.

If the monitor flag is not set, then a test is made to determine whether the synthesizer is locked to insure that the receiver is on frequency (608). If the synthesizer 22 is not locked, then an alarm condition is indicated, the channel is reloaded (610) and the synthesizer is again checked to see whether it is locked. Once the synthesizer check reveals a locked state, a test is made to determine whether the squelch is open or closed (612). If the squelch is closed, then the channel busy flag is checked to determine whether the channel has been lost (614). If the busy flag is not off, then a check is made as to whether the scan is on or off (616). If scan is not enabled, then a normal idle state is detected and the audio is turned off and the display is updated (618), after which the aforementioned UDC test routine is executed (606). If scan is enabled, then a scanning routine (617) is executed. The channel scanning routine is not germane to the present invention and may be implemented in a conventional manner.

Turning back to block 614, if the busy flag is off, then a check is once again made to determine whether scan is enabled (620) and, if so, the scan routine is executed (617). If the scan key is not enabled, then the UDC test routine is executed (606).

Turning back to the squelch open test (612), if the squelch is open, then a check is made to determine whether the scan is enabled (622), and if so, the scan routine is executed (617). If the scan is not enabled, a test is made to determine whether the audio paths in the audio processor 24 are open (624) by checking the state of switches 912 in the FIG. 9 schematic of the audio processor. The manner in which the audio processor 24 is controlled to perform this function is disclosed in detail in the aforementioned patent application filed concurrently herewith. If the audio path is already open, then the routine jumps to the scan on check at block 636 shown in FIG. 5b.

If the audio paths have not yet been opened, then a check is made at 626 to determine whether the option board 10 is present. If the option board is present, then a check as to whether a "Type 99" special signaling option (628) is an active option and if so, checks to determine whether the Type 99 decode flag has been set (630). If the flag has not been set, the option board processor 12 is sent a command (632) by the control microprocessor 8 to utilize the Type 99 signalling option.

The Type 99 signaling option is the aforementioned selective call decoding technique in which two tones are sequentially transmitted from a base station and received and decoded by the radio system of FIG. 1. The option board microprocessor 12 first senses a predetermined initial tone, and if that tone is detected, it look for a second predetermined tone. If this second tone is also detected, then the option processor 12 sends back a signal to the control microprocessor 8 indicating that it has in fact decoded a Type 99 signal. The audio path will be opened which in turn causes the Type 99 decode flag to be set.

After the command has been sent to the signaling board, the busy signal indicator on the display is turned on (634) which indicates that there is activity on the channel. Next a test is made to determine whether the scan key has been depressed (636). If the scan key has been depressed, then a check is made as to whether a priority scan is taking place (656). If a priority scan is being made, then the scan routine is executed (617).

If the scan key has not been depressed, then a series of tests are performed to determine whether one or more signaling options have been selected. At 638 a check has been made to determine whether the selected signaling options have been switched off or enabled by the user operation of a control key. If the signaling options are in the enabled state, then a check is first made at 640 to see whether a channel guard tone has been received. If a channel guardtone has been received, then a further check is made to see whether the Type 99 signaling option has been selected (642).

If the Type 99 option has been selected, then a check is made to determine whether both signaling options must be decoded or only one of the two (644). If the type of decode is an "OR" function, then if channel guard is decoded in block 648, the audio will be turned on in 654. If the type of decode is an "OR" function, and channel guard has not been decoded, then a check is made as to whether the Type 99 option is present (652). If not, the audio is turned on (654). If the type of decode is an "OR" function, and channel guard is not present, the audio will be turned on if Type 99 is decoded at block 660. If an "AND" function is detected at 644, then if both the channel guard and the Type 99 options are decoded at 646 and 660, the audio will be turned on.

If the test at 652 indicates that the Type 99 option is present, then at 658, a check is made to determine whether the Type 99 decode flag has been set. If this is the first pass through the receive routine and the Type 99 decode flag has not been set, the control microprocessor sends a Type 99 decode command to the option microprocessor. If the decode flag has not been set, then a test (660) is made of the control processor I/O ports to look for an indication that the Type 99 has been decoded. If not, then the audio is turned off (650). If Type 99 has been decoded (660), then an alert tone is generated depending upon the particular decoding scheme being utilized (662). This alert tone will, for example, allow an individual to be called or a group of individuals e.g., policemen, to be alerted. After generating an alert tone, a check is made as to whether the busy indicator is already on (664).

Turning back to 658, if the Type 99 decode flag has been set, then a check is made to see whether the busy signal indicator is already on (664) and if it is, then the aforementioned UDC test routine 606 is entered. If it is not, then the audio paths must be opened and the display must be updated (666), after which the UDC test routine is entered.

Turning to FIG. 6, a flowchart is shown delineating the generic operations performed by the option board microprocessor software. After initial power up (700), the option board microprocessor 12 sets up its input and output ports and responds to the signals sent by the control microprocessor 8 in order to acknowledge its interconnection in the system (702).

Next, the option board processor 12 retrieves necessary "personality" data from the control microprocessor (704). This is accomplished by option board microprocessor 12 transmitting to the control microprocessor 8 the address in RAM 7 and the number of data bytes of data that are required. This information is sent to the control microprocessor 8 as part of a program which is executed by the control microprocessor 8. In this fashion, the option board microprocessor can read any address in RAM 7 by utilizing the software of the control microprocessor 8.

At 706, an option board microprocessor interrupt is enabled which permits the control microprocessor 8 to interrupt the option board microprocessor 12 at any time. Thereafter, a stop mode is entered (708). The stop mode is a low current draining mode and is only exited when an enabled interrupt is received from the control microprocessor 8 (710).

After receiving an interrupt request from the control microprocessor 8, the option processor 12 retrieves an instruction from the control microprocessor 8 identifying the function to be performed, e.g., an instruction to decode Type 99 data (712). Thereafter, the option board microprocessor performs the function as indicated by the control microprocessor 8 and sends the required response to the control microprocessor (714). Thereafter, control loops back to the enable interrupt block 706 and the cycle is repeated.

Turning now to FIG. 7, a flowchart of the option board software for implementing blocks 712 and 714 of FIG. 6 for the tone decode selective call option is shown. As shown in blocks 628 through 632 of FIG. 5a, when the control microprocessor 8 determines that the selective call decoding option Type 99 is being utilized, a command will be generated and transmitted to the option board microprocessor 12 to decode Type 99 data.

A decode Type 99 data routine will then be executed by the option board microprocessor (800). Upon being called, this option board routine causes the monitoring of the input data received from A/D converter 16 and the decoding of a first predetermined tone in the sequence. After decoding the first tone, processor 12 looks for the second tone (802).

Upon determining that the proper tone sequence is present (804), data is then sent to the control microprocessor 8 which will enable the receiver audio paths audio processor 24 as discussed above (806). Turning back to block 804, if the tone sequence is not present, then a branch will be made to the input of block 802 to continue looking for the proper sequence of tone and the previously discussed sequence of steps is repeated until the decoding function has been completed.

Turning now to FIG. 8, the option board processor 12 also has the capability of executing an emergency routine by which an emergency message is transmitted. The option processor 12 receives a signal from the control microprocessor 8 indicative of a detected emergency condition (810). This condition may be detected upon, for example, a police officer closing an emergency switch on the radio. When the control microprocessor 8 detects that such a switch has been closed, then a signal is transmitted to microprocessor 12 which takes it out of the stop mode to receive an emergency routine call from the control microprocessor.

Once this condition is detected, the program synthesizer 22 is loaded with data indicating the special emergency channel (812). After the control microprocessor 8 has been controlled to load the correct frequency information into the synthesizer, the tone path will be enabled in the audio processor 24 to permit the transmission of an emergency message including a transmitter ID (814). This message will be transmitted by microprocessor 12 from D/A converter 14 to the tone input of audio processor 24 to modulate the carrier frequency transmitted by transmitter 26. After the initial emergency data transmission, a predetermined time period is waited and then emergency data is retransmitted until the message has been transmitted, for example, five times (816). After completion of the emergency message transmission, the tone path is then disabled to complete the emergency function data transmission sequence (818).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A digitally-controlled radio communication device comprising:
    basic control processor means including means for operating in a first mode for controlling a first set of radio functions; and
    option processor means, coupled to said basic control processor means, for controlling at least one additional radio function, said basic control processor means including means for sensing the presence of said option processor means and for operating in a second mode in response to sensing the presence of said options processor means, said option processor means including means for communicating with said basic control processor means to enable the basic control processor means to operate in said second mode to control the performance of said at least one additional radio control function.

2. A radio communication device according to claim 1, wherein said basic control processor means includes means for transmitting to said option processor means information related to a function required to be performed.

3. A radio communication device according to claim 1, further including means, coupled to said basic control processor means, for entering data and commands.

4. A radio communication device according to claim 3, wherein said means for entering includes:
    first control key means for initiating the performance of one of said radio control functions controlled by said basic control processor means; and
    additional function keypad means for entering additional function related data, said basic control processor means including means responsive to said addition function related data for initiating the performance of said at least one said additional radio control function by said basic control processor means and said option processor means.

5. A radio communication device according to claim 1, wherein said option processor means is a pluggably attached component of said radio communication device.

6. A radio communication device according to claim 1, further including:
    data entry means for entering data and control commands;
    memory means, connected to said basic control processor means and said data entry means, for storing radio operating parameter data;
    frequency synthesizer means coupled to said basic control processor means for determining an operating radio frequency in response to control signals applied thereto;
    audio processor means having a plurality of inputs and outputs, and being responsive to signals from said basic control processor means and said option processor means, for filtering, shaping, and routing input audio signals; and
    means coupled to said frequency synthesizer means and said audio processor means, for selectively transmitting or receiving radio frequency signals.

7. A radio communication device according to claim 6, further including display means connected to said basic control processor means for displaying radio operating parameter related data.

8. A radio communication device according to claim 6, further including universal devices connector means coupled to said basic control processor means for coupling said radio device to at least one external audio accessory component.

9. A radio communication device according to claim 6, further including serial bus means connected to said basic control processor, said basic control processor means including means for transmitting data and control signals across said serial bus to a predetermined one of said option processor means and said audio processor means.

10. A radio communication device according to claim 9, wherein said basic control processor means and said option processor means include means for transferring data and/or control signals directly to said audio processor.

11. A radio communication device according to claim 9, further including display means for displaying radio operating parameter related data, said basic control processor means further including communication enabling means for enabling data and/or control signals to be received by a predetermined one of said option processor means, said audio processor means, said display means, and said frequency synthesizer means.

12. A radio communication device according to claim 1, wherein said option processor means includes means for enabling the radio to perform selective call decoding.

13. A radio communication device according to claim 1, wherein said option processor means includes means for providing signal encoding to enable communication with a telephone system.

14. A radio communication device according to claim 1, wherein said option processor means includes means for enabling the transmission of identification and/or status messages.

15. A radio communication device according to claim 1, further including means for enabling a continuous tone controlled squelch signalling option.

16. A radio communication device according to claim 1, wherein said basic control processor means includes a single chip processing device having an internal program memory and an internal data memory.

17. A radio communication device according to claim 1, further including means, coupled to said basic control processor means, for transmitting and receiving radio frequency signals, and audio processor means, coupled to said basic control processing means for processing input audio signals applied thereto; said option processor means including means for controlling the basic control processor means to control at least one of said means for transmitting and receiving and said audio processor means.

18. A digitally-controlled radio communication device comprising:
basic control processor means for controlling a first set of radio functions;
option processor means, coupled to said basic control processor means, for controlling at least one additional radio function, said option processor means including means for communicating with said basic control processor means to enable the basic control processor means to control the performance of said at least one additional radio control function, wherein said option processor means includes means for transferring control instructions defining tasks to be performed by said basic control processor means to said basic control processor means; and wherein
said basic control processor means includes means for performing the tasks indicated by said control instructions.

19. A radio communication device according to claim 18, wherein said means for performing tasks operates to perform said at least one additional radio control function.

20. A digitally-controlled radio communication device comprising:
basic control processor means for controlling a first set of radio functions; and
option processor means, coupled to said basic control processor means, for controlling at least one additional radio function, said option processor means including means for communicating with said basic control processor means to enable the basic control processor means to control the performance of said at least one additional radio control function, wherein said basic control processor means includes means for sensing the presence of said option processor means, and means for transferring information to the option processor means if the presence of said option processor means is detected.

21. A radio communication device according to claim 20, wherein said option processor means and said basic processor means are interconnected by at least one control line, and wherein said means for sensing the presence of said option processor means includes means for periodically transmitting a control signal on said control line, said option processor means including means responsive to said control signal for transmitting an option processor present signal to said basic control processor means.

22. A radio communication device according to claim 20, wherein said basic control processor means includes means responsive to the detected presence of said option processor means to transfer control data to said option processor means for identifying at least one task.

23. A radio communication device according to claim 22, further including data entry means coupled to said basic control processor means and wherein said control data includes key identifying data; said option processor means including means responsive to said key identifying data for supplying control instructions necessary for accomplishing the at least one task indicated by said control data.

24. A radio communication device according to claim 23, wherein said option board processor means further includes means for transferring said control instructions to said basic control processor means; said basic control processor means including means for executing said control instructions.

25. A radio communication device according to claim 24, wherein said basic control processor means includes internal memory means having storage locations reserved for storing said control instructions transferred by said option processor means.

26. A digitally controlled radio communication device comprising:
basic control processor means for controlling a first set of basic radio functions;
option board processor means connected to said basic control processor means and pluggably connected in said device for enabling said radio communication device to perform at least one additional radio function not included in said first set of radio control functions, said basic control processor means including means for sensing the presence of said option board processor means and for receiving control instructions from said option board processing means;

said option board processor means including means for transferring control instructions for execution by said basic control processor means to control at least one of said basic radio functions and said at least one additional radio function, whereby said basic control processor means and said option board processor means interact during the operation of the radio communication device to control the performance of at least one of the first set of basic radio functions and said at least one additional radio function.

27. A radio communication device according to claim 26, wherein said basic control processor means includes means for transmitting to said option processor means information related to a function required to be performed, said function being one of said basic radio functions or one of said additional radio functions.

28. A radio communication device according to claim 26, further including means for entering data and commands; said means for entering including first control key means for initiating the performance of one of said basic radio functions controlled by said basic control processor means; and additional function keypad means for entering additional function related data, said basic control processor means including means responsive to said additional function related data for initiating the performance of said at least one additional radio control function.

29. A radio communication device according to claim 26, further including data entry means for entering data and control commands;

memory means connected to said basic control processor means and said data entry means, for storing radio operating parameter data;

frequency synthesizer means coupled to said basic control processor means for determining an operating radio frequency in response to control signals applied thereto;

audio processor means having a plurality of inputs and outputs, responsive to signals from said basic control processor means and said option processor means, for filtering, shaping, and routing input audio signals; and means, coupled to said frequency synthesizer means and said audio processor means, for selectively transmitting or receiving radio frequency signals.

30. A radio communications device according to claim 29, further including serial bus means connected to said basic control processor means and said option processor means, said basic control processor means including means for transmitting data and control signals across said serial bus to a predetermined one of said option processor means and said audio processor means.

31. A radio communications device according to claim 30, wherein said basic control processor means and said option processor means include means for transferring data and/or control signals directly to said audio processor means.

32. A radio communications device according to claim 26, wherein said option processor means includes means for enabling the radio to perform selective call decoding.

33. A radio communication device according to claim 32, further including means for enabling a continuous tone controlled squelch signalling option.

34. A radio communications device according to claim 26, wherein said option processor means includes means for providing signal encoding to enable communication with a telephone system.

35. A radio communication device according to claim 26, wherein said option processor means includes means for enabling the transmission of identification and/or status messages.

36. A radio communication device according to claim 26, wherein said basic control processor means is a single chip processing device having internal program and data memory.

37. A radio communications device according to claim 26, further including means coupled to said basic control processor means, for transmitting and receiving radio frequency signals and audio processor means coupled to said basic control processor means for processing input audio signals applied thereto, said means for programming including means for controlling the basic control processor means to control at least one of said means for transmitting and receiving said audio processor means.

38. A digitally controlled radio communication device comprising:

basic control processor means for controlling a first set of basic radio functions;

option board processor means connected to said basic control processor means and pluggably connected in said device for enabling said radio communication device to perform at least one additional radio function not included in said first set of radio control functions;

said option board processor means including means for programming said basic control processor means to control at least one of said basic radio functions and said at least one additional radio function, wherein said basic control processor means includes means for sensing the presence of said option processor means and for transferring control data to said option processor means for identifying at least one task.

39. A radio communication device according to claim 38, wherein said control data includes key identifying data; said option processor means including means responsive to said key identifying data for supplying control instructions necessary for accomplishing the at least one task indicated by said control data.

40. A radio communication device according to claim 39, wherein said basic control processor means includes internal memory means having storage locations reserved for storing said control instructions transferred by said option processor means.

41. In a digitally-controlled radio communication device having digital processing means for controlling radio functions; audio processing means coupled to said digital processing means for processing audio signals applied thereto; a method of controlling said radio communication device comprising the steps of:

controlling a first set of radio functions with a first control microprocessor means in a first operating mode;

sensing the presence of a second option microprocessor means by said first control microprocessor means;

switching said first control microprocessor means from said first operating mode to a second operating mode in response to sensing the presence of said second option microprocessor means; and controlling at least one additional radio function with said second option microprocessor means.

42. A method according to claim 41, further including the steps of:

transferring control instructions from the option microprocessor means to the first control microprocessor means; and executing the control instructions by the first control microprocessor means.

43. A method according to claim 42, further including the steps of:

transmitting from said first control microprocessor means to the option microprocessor means information related to a function required to be performed; and generating said control instructions by said option microprocessor means in response to said information.

44. A method according to claim 43, further including the step of:

sensing, via said control microprocessor means, the presence of said option processor means; and transferring information to the option processor means if the presence of said option processor means is detected.

45. A method according to claim 44, further including the step of:

interconnecting the option microprocessor means and the first control microprocessor means to at least one control line, and wherein said step of sensing the presence of said option processor means includes the step of periodically transmitting a control signal on said control line, said option processor means transmitting an option processor present signal to said basic control processor means in response to said control signal.

46. A method according to claim 45, wherein said control microprocessor means responds to processor present signal to transfer control data to said option microprocessor means.

47. A method according to claim 46, said device further including data entry means coupled to said basic control processor means, and wherein said control data includes key identifying data; said method further including: supplying control instructions, via said option microprocessor means, in response to said key identifying data to accomplish the task indicated by said control data.

48. A method according to claim 47, further including transferring via said option microprocessor means, said control instructions to said control microprocessor; and executing said control instructions by said control microprocessor means.

49. A method according to claim 41, wherein said radio device further includes means for entering data and commands; said method further including the steps of:

initiating the performance of one of said radio control functions controlled by said first control processor means by any of a set of first control keys; and initiating the performance of said at least one additional radio function by any one of a set of second keys.

50. A method according to claim 41, further including the step of plugging said option microprocessor means into said radio to thereby convert a standard function radio to an extended function radio.

51. A method according to claim 41, further including: controlling the performance of selective call decoding by at least said option microprocessor means.

52. A method according to claim 41, further including: controlling the option microprocessor means to provide signal encoding to enable communication with a telephone system.

53. A method according to claim 41, further including: controlling the option microprocessor means to enable the transmission of identification and/or status messages.

54. A method according to claim 41, further including performing a continuous tone controlled squelch signalling option using both the basic control microprocessor means and the option microprocessor means.

55. A method according to claim 41, said radio communication device further including means coupled to said first control microprocessor means, for transmitting and receiving radio frequency signals, and audio processor means, coupled to said first control microprocessor, for processing input audio signals applied thereto, said method further including controlling the first control microprocessor means by the option microprocessor means to control at least one of said means for transmitting and receiving and said audio processor.

56. In a digitally controlled radio communication device having control processing means for controlling radio functions; means for transmitting and receiving radio frequency audio signals;

audio processing means, coupled to said control processing means and said means for transmitting and receiving for processing and routing audio signals applied thereto; a method of controlling said radio communication device comprising the steps of:

sensing whether an option microprocessor is interconnected with a single chip control microprocessor;

operating the radio in a first mode under the control of said single chip control microprocessor to perform a first set of basic radio functions; and operating the radio in a second expanded function mode, responsive to the interconnection of said option microprocessor to said first control microprocessor, to perform at least one addition radio function.

57. A method according to claim 56, further including the steps of:

controlling the option microprocessor to transfer executable code to the control microprocessor; and controlling the control microprocessor to execute said executable code to perform a desired task.

58. A digitally-controlled radio communication device comprising:

basic control processor means for controlling a first set of radio functions;

option processor means, coupled to said basic control processor means, for controlling at least one additional radio control function; and audio processing means responsive to control signals from said basic control processor means and said option processing means for filtering and routing input audio signals applied thereto.

* * * * *

UNITED STATES PATENT AND TRADEMARK OFFICE
CERTIFICATE OF CORRECTION

PATENT NO. : 4,887,311

DATED : December 12, 1989

INVENTOR(S) : Terry N. Garner, Robert P. Dixon

It is certified that error appears in the above-identified patent and that said Letters Patent is hereby corrected as shown below:

The title page showing the illustrative figure, should be deleted, and substitute therefor the attached title page.

Signed and Sealed this

Fifth Day of May, 1992

Attest:

DOUGLAS B. COMER

*Attesting Officer*　　　*Acting Commissioner of Patents and Trademarks*

United States Patent [19]

Garner et al.

[11] Patent Number: 4,887,311

[45] Date of Patent: Dec. 12, 1989

[54] RADIO WITH OPTIONS BOARD

[75] Inventors: Terry N. Garner, Lynchburg; Robert P. Dixon, Rustburg, both of Va.

[73] Assignee: General Electric Company, Lynchburg, Va.

[21] Appl. No.: 39,331

[22] Filed: Apr. 17, 1987

[51] Int. Cl.[4] .......................... H04B 1/40; H04B 1/06
[52] U.S. Cl. ................................ 455/76; 455/183; 455/186; 455/349
[58] Field of Search ............... 455/76, 77, 183, 186, 455/151, 349, 185; 340/825.44, 825.48

[56] References Cited

U.S. PATENT DOCUMENTS

| 4,484,355 | 11/1984 | Henke et al. | 455/76 |
| 4,486,624 | 12/1984 | Puhl et al. | 455/77 |
| 4,618,997 | 10/1986 | Imazeki et al. | 455/76 |
| 4,688,261 | 8/1987 | Killoway et al. | 455/76 |
| 4,771,399 | 9/1988 | Snowden et al. | 455/186 X |

OTHER PUBLICATIONS

"The Up: The Key to an Advanced Frequency Synthesized HF SSB Amateur Radio Transceiver", IEEE Transactions on Consumer Electronics; vol. CE-26, Aug. 1980, Robert M. Groh et al., pp. 234-246.
Motorola Dyna Tac 6000X Universal Mobile Telephone; 9/12/83.

Primary Examiner—Benedict V. Safourek
Assistant Examiner—Ralph Smith
Attorney, Agent, or Firm—Nixon & Vanderhye

[57] ABSTRACT

A FM mobile radio is disclosed which is capable of future functional expansion due to a unique microprocessor hardware/software control system. The radio includes a control microprocessor which is capable of performing all the basic radio control functions. In addition, options are added via a plug-on board that includes an option microprocessor which interfaces with the control microprocessor over a data bus and with the radio's audio circuits through audio processing circuitry. The software of the system allows control to be passed to the option board. The radio operates in a standard control mode and an option control mode. In the standard mode, in which no option board is present, the control processor performs all basic radio control functions. In the option mode, where the option control microprocessor is present, the main control processor typically receives commands from the option board.

58 Claims, 11 Drawing Sheets